(12) United States Patent
Amer et al.

(10) Patent No.: US 12,621,137 B2
(45) Date of Patent: May 5, 2026

(54) SYSTEMS AND METHODS FOR CONDUCTING COMPOSABLE QUANTUM OBLIVIOUS TRANSFER OVER NOISY QUANTUM CHANNELS

(71) Applicant: JPMORGAN CHASE BANK, N.A., New York, NY (US)

(72) Inventors: Omar Amer, New York, NY (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 843 days.

(21) Appl. No.: 18/045,708

(22) Filed: Oct. 11, 2022

(65) Prior Publication Data

US 2025/0350451 A1 Nov. 13, 2025

(51) Int. Cl.
*H04L 9/08* (2006.01)
*H04L 9/06* (2006.01)

(52) U.S. Cl.
CPC .......... *H04L 9/0858* (2013.01); *H04L 9/0643* (2013.01)

(58) Field of Classification Search
CPC ............................ H04L 9/0858; H04L 9/0643
See application file for complete search history.

(56) References Cited

U.S. PATENT DOCUMENTS

| | | | | |
|---|---|---|---|---|
| 6,851,086 B2 * | 2/2005 | Szymanski | ........... | H03M 13/09 |
| | | | | 714/781 |
| 7,627,126 B1 * | 12/2009 | Pikalo | .................. | H04L 9/0858 |
| | | | | 713/168 |
| 2007/0192598 A1 * | 8/2007 | Troxel | ................. | H04L 9/0858 |
| | | | | 713/168 |
| 2021/0152346 A1 * | 5/2021 | Bucklew | ............... | H04B 10/66 |

OTHER PUBLICATIONS

E. Knill; "Quantum computing with realistically noisy devices"; 2005, Mathematical and Computational Sciences Division, National Institute of Standards and Technology, Boulder, Colorado 80305, USA; p. 39-44; (Year: 2005).*

S. M. Jahangir Alam, M. Rabiul Alam, Guoqing Hu, and Md. Zakirul Mehrab; "Bit Error Rate Optimization in Fiber Optic Communications" International Journal of Machine Learning and Computing, vol. 1, No. 5, Dec. 2011 (Year: 2011).*

* cited by examiner

*Primary Examiner* — Mohammed Waliullah
(74) *Attorney, Agent, or Firm* — GREENBERG TRAURIG LLP

(57) ABSTRACT

Systems and methods for conducting composable quantum oblivious transfer over noisy quantum channels are disclosed. Embodiments provide a method for constructing a quantum oblivious transfer (QOT) protocol using noisy quantum channels and devices through the use of a quantum-hard one-way function. This construction allows the construction of QOT protocols that achieve simulator security, allowing them to be used in a black-box fashion as part of other cryptographic constructions, including arbitrary secure multiparty computations.

22 Claims, 4 Drawing Sheets

100

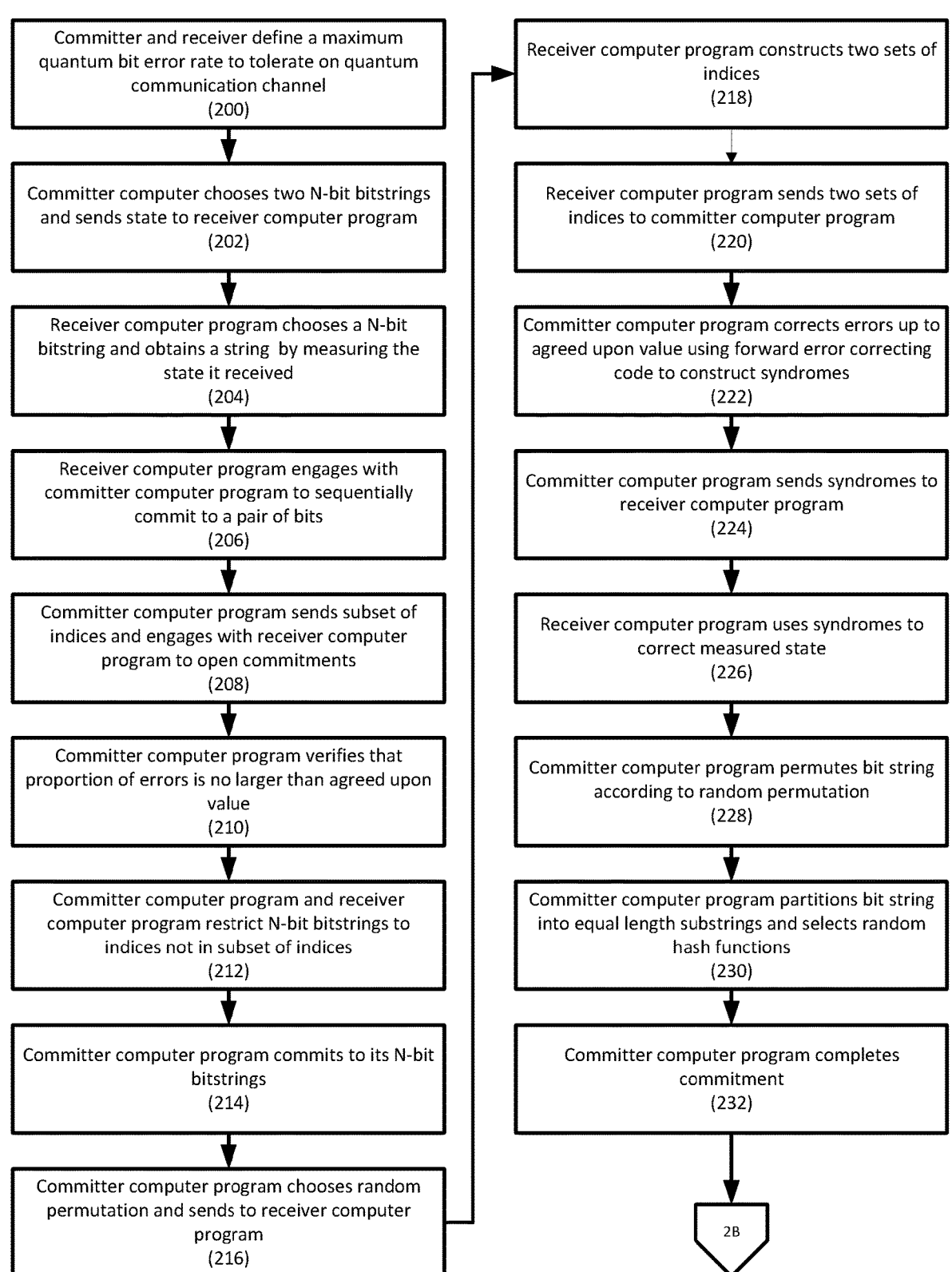

Committer and receiver define a maximum quantum bit error rate to tolerate on quantum communication channel
(200)

Committer computer chooses two N-bit bitstrings and sends state to receiver computer program
(202)

Receiver computer program chooses a N-bit bitstring and obtains a string by measuring the state it received
(204)

Receiver computer program engages with committer computer program to sequentially commit to a pair of bits
(206)

Committer computer program sends subset of indices and engages with receiver computer program to open commitments
(208)

Committer computer program verifies that proportion of errors is no larger than agreed upon value
(210)

Committer computer program and receiver computer program restrict N-bit bitstrings to indices not in subset of indices
(212)

Committer computer program commits to its N-bit bitstrings
(214)

Committer computer program chooses random permutation and sends to receiver computer program
(216)

Receiver computer program constructs two sets of indices
(218)

Receiver computer program sends two sets of indices to committer computer program
(220)

Committer computer program corrects errors up to agreed upon value using forward error correcting code to construct syndromes
(222)

Committer computer program sends syndromes to receiver computer program
(224)

Receiver computer program uses syndromes to correct measured state
(226)

Committer computer program permutes bit string according to random permutation
(228)

Committer computer program partitions bit string into equal length substrings and selects random hash functions
(230)

Committer computer program completes commitment
(232)

SYSTEMS AND METHODS FOR CONDUCTING COMPOSABLE QUANTUM OBLIVIOUS TRANSFER OVER NOISY QUANTUM CHANNELS

BACKGROUND OF THE INVENTION

1. Field of the Invention

Embodiments are generally related to systems and methods for conducting composable quantum oblivious transfer over noisy quantum channels.

2. Description of the Related Art

Oblivious transfer is a cryptographic primitive known to be universal for all secure multiparty computations (MPC), including many other common cryptographic protocols such as key-exchange and bit-commitment. There are a number of impossibility results, classically, regarding the construction of oblivious transfer from other cryptographic primitives; namely, they cannot be constructed from bit-commitment, nor from one-way functions. This impossibility, however, is not true in the context of quantum communication, where one may construct an oblivious transfer protocol given a quantum-hard one-way function. Examples of quantum enabled oblivious transfer are described in J. Bartusek, A. Coladangelo, D. Khurana, et al., "One-way functions imply secure computation in a quantum world," in Annual International Cryptology Conference, Springer, pp. 467-496 (2021), C. Crépeau and J. Kilian. "Achieving oblivious transfer using weakened security assumptions (extended abstract)". In 29th FOCS, pages 42-52. IEEE Computer Society Press, October 1988, C. Bennett, G. Brassard, C. Crépeau, and M. Skubiszewska. "Practical quantum oblivious transfer." In Joan Feigenbaum, editor, CRYPTO'91, volume 576 of LNCS, pages 351-366. Springer, Heidelberg, August 1992, and M. Naor. "Bit commitment using pseudorandomness." Journal of Cryptology, 4 (2): 151-158, January 1991. The disclosures of these documents are hereby incorporated, by reference, in their entireties.

SUMMARY OF THE INVENTION

Systems and methods for conducting composable quantum oblivious transfer over noisy quantum channels are disclosed. In one embodiment, a method for conducting sequentially composable quantum oblivious transfer over noisy quantum channels may include: (1) defining, by a committer computer program executed by a committer electronic device and with a receiver computer program executed by a receiver electronic device, to a maximal quantum bit error rate over a quantum communication channel; (2) verifying, by the committer computer program, that a current quantum bit error rate for a quantum communication between the committer electronic device and the receiver electronic device is no larger than the maximal quantum bit error rate; (3) restricting, by the committer computer program, a first committer bitstring and a second committer bitstring to a first set of indices; (4) sending, by the committer computer program, the second committer bitstring to the receiver computer program; (5) committing, by the committer computer program, to the first committer bitstring and the second committer bitstring using a statistically hiding or binding bit commitment scheme; (6) choosing, by the committer computer program, a random permutation on the first committer bitstring; (7) partitioning, by the committer computer program, the first committer bitstring into a plurality of equal length substrings; and (8) applying, by the committer computer program, a random hash function to each of the equal length substrings and masking a value of a commitment bit using an output of the random hash functions.

In one embodiment, the method may also include sending, by the committer computer program, a sequence of qubit states to the receiver computer program as determined by the first committer bitstring and a second committer bitstring.

In one embodiment, the method may also include opening, by the committer computer program, commitments to the first committer bitstring and the second committer bitstring; and sending, by the committer computer program, the committed bit to the receiver computer program.

In one embodiment, the method may also include sending, by the committer computer program, the random hash functions and the receiver masked value to the receiver computer program, and the receiver computer program is configured to permute the first receiver bitstring according to the random permutation, compute a receiver masked value for the committed bit using the first receiver bitstring and the hash functions, verify that the receiver masked value for the committed bit is consistent with the masked value received from the committer computer program, and verify that the committer bitstring is consistent with the receiver bitstring at indices in the first set of indices where basis choices match.

In one embodiment, the maximal quantum bit error rate dictates an amount of practical noise allowed over the quantum communication channel.

In one embodiment, the committer computer program commits to the first committer bitstring and the second committer bitstring using a statistically hiding or binding bit commitment scheme.

In one embodiment, the method may also include receiving, by the committer computer program and from the receiver computer program, two second sets of indices; correcting, by the committer computer program, up to the maximal quantum bit error rate in partitioned bits for the first receiver bitstring by constructing a plurality of syndromes that are partitioned by the two second sets of indices; sending, by the committer computer program, the plurality of syndromes to the receiver computer program, wherein the receiver computer program is configured to correct errors in a first receiver bitstring; and permuting, by the committer computer program, the first committer bitstring using the random permutation.

In one embodiment, the plurality of syndromes comprise information that configures the receiver computer program to use a decoding technique to correct errors in the first receiver bitstring.

According to another embodiment, a method for conducting sequentially composable quantum oblivious transfer over noisy quantum channels may include: (1) defining, by a receiver computer program executed by a committer electronic device and with a committer computer program executed by a receiver electronic device, to a maximal quantum bit error rate over a quantum communication channel; (2) measuring, by the receiver computer program, a first receiver bitstring by measuring a state received from the committer computer program over the quantum communication channel; (3) restricting, by the receiver computer program, a first receiver bitstring and a second receiver bitstring to a first set of indices; (4) receiving, by the receiver computer program, a random permutation from the committer computer program; (5) constructing, by the receiver computer program, two second sets of indices; (6) sending, by the receiver computer program, the two second sets of indices to the committer computer program; (7) receiving, by the receiver computer program, a plurality of syndromes that are partitioned by the two second sets of indices; (8) correcting, by the receiver computer program, the measured state using the plurality of syndromes; and (9) receiving, by the receiver computer program, a plurality of hash functions and masked values for a committed bit that are masked with an output of the hash function from the committer computer program.

In one embodiment, the method may also include receiving, by the receiver computer program, a value for the committed bit; and confirming the value of the committed by calculating, by the receiver computer program, the value for the committed bit using the plurality of hash functions and the masked value.

In one embodiment, the state received from the committer computer program comprises a first committer bitstring and a second committer bitstring.

In one embodiment, the method may also include permuting, by the receiver computer program, the first receiver bitstring according to the random permutation; computing, by the receiver computer program, a receiver masked value for the committed bit using the first receiver bitstring and the hash functions; verifying, by the receiver computer program, that the receiver masked value for the committed bit is consistent with the masked value received from the committer computer program; and verifying, by the receiver computer program, that the committer bitstring is consistent with the receiver bitstring at indices in the first set of indices where basis choices match.

In one embodiment, the maximal quantum bit error rate dictates an amount of practical noise allowed over the quantum communication channel to be withstood while maintaining a desired security level.

In one embodiment, the state received from plurality of syndromes comprise information that configures the receiver computer program to use a decoding technique to correct errors in the first receiver bitstring.

According to another embodiment, a system may include a committer electronic device executing a committer computer program; a receiver electronic device executing a receiver computer program; and a quantum communication channel over which the committer electronic device and the receiver electronic device communicate quantum information. The committer computer program and the receiver computer program define a maximal quantum bit error rate over a quantum communication channel; the receiver computer program measures a first receiver bitstring by measuring a state received from the committer computer program over the quantum communication channel; the committer computer program verifies that a current quantum bit error rate for the quantum communication channel is no larger than the maximal quantum bit error rate; the committer computer program restricts a first committer bitstring and a second committer bitstring to a first set of indices; the committer computer program sends the second committer bitstring to the receiver computer program; the committer computer program commits to the first committer bitstring and the second committer bitstring using a statistically hiding or binding bit commitment scheme; the committer computer program chooses a random permutation on the first committer bitstring; the receiver computer program constructs and sends two sets of second indices to the committer computer program; the committer computer program corrects partitioned bits for the first receiver bitstring up to the maximal quantum bit error rate by constructing a plurality of syndromes that are partitioned by the two sets of second of indices; the committer computer program sends the plurality of syndromes to the receiver computer program; the receiver computer program corrects errors in a first receiver bitstring using the plurality of syndromes; the committer computer program permutes the first committer bitstring using the random permutation; and the committer computer program partitions the first committer bitstring into a plurality of equal length substrings; the committer computer program applies a random hash function to each of the equal length substrings and masking a value of a commitment bit using an output of the random hash functions.

In one embodiment, the committer computer program sends a qubit state to the receiver computer program comprising the first committer bitstring and a second committer bitstring.

In one embodiment, the committer computer program opens commitments to the first committer bitstring and the second committer bitstring and sends the committed bit to the receiver computer program.

In one embodiment, the receiver computer program receives a plurality of hash functions and masked values for a committed bit that are masked with an output of the hash function from the committer computer program.

In one embodiment, the committer computer program sends the random hash functions and the receiver masked value to the receiver computer program, and the receiver computer program permutes the first receiver bitstring according to the random permutation, computes a receiver masked value for the committed bit using the first receiver bitstring and the hash functions, verifies that the receiver masked value for the committed bit is consistent with the masked value received from the committer computer program, and verifies that the committer bitstring is consistent with the receiver bitstring at indices where basis choices match.

In one embodiment, the maximal quantum bit error rate dictates an amount of practical noise allowed over the quantum communication channel.

In one embodiment, the state received from plurality of syndromes comprise information that configures the receiver computer program to use a decoding technique to correct errors in the first receiver bitstring.

In one embodiment, the system may also include a classical communication channel over which the committer electronic device and the receiver electronic device communicate classical information.

BRIEF DESCRIPTION OF THE DRAWINGS

For a more complete understanding of the present invention, the objects and advantages thereof, reference is now made to the following descriptions taken in connection with the accompanying drawings in which:

FIGS. 2A and 2B depict a method for conducting composable quantum oblivious transfer over noisy quantum channels according to an embodiment.

DETAILED DESCRIPTION OF PREFERRED EMBODIMENTS

Embodiments relate generally to systems and methods for conducting composable quantum oblivious transfer over noisy quantum channels.

Embodiments provide a method for constructing a quantum oblivious transfer (QOT) protocol using noisy quantum channels and devices through the use of a quantum-hard one-way function. This construction allows the construction of QOT protocols that achieve simulator security, allowing them to be used in a black-box fashion as part of other cryptographic constructions, including arbitrary secure multiparty computations.

Embodiments solve the problem of compiling extractable and equivocable bit commitment schemes from a computationally secure bit commitment scheme through the use of a noisy-quantum channel. Specifically, embodiments add a noise-tolerant extractability compiler, which converts a noisy quantum channel and an equivocable, statistically-binding and computationally hiding bit commitment scheme into an extractable, computationally hiding and computationally binding bit commitment scheme.

Figure 1:
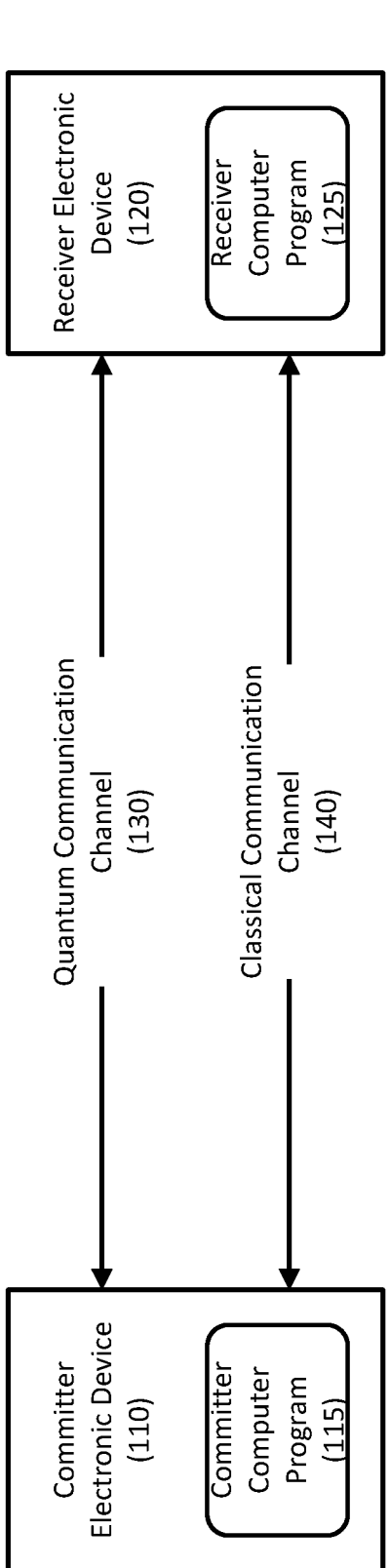
FIG. 1 depicts a system for conducting composable quantum oblivious transfer over noisy quantum channels according to an embodiment.
Figure 1:
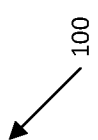

Referring to FIG. 1, a system for conducting composable quantum oblivious transfer over noisy quantum channels is disclosed according to an embodiment. System 100 may include committer (or sender) electronic device 110, and receiver electronic device 120. In one embodiment, committer electronic device 110 and receiver electronic device 120 may be able to produce and detect single photons, respectively, or make use of additional techniques to ensure that security is guaranteed in the case that multiple photons are emitted (e.g., through the use of decoy-state-like techniques). Examples of such devices include hardware making use of an attenuated laser source and single photon detectors, commercial Quantum Key Distribution (QKD) devices that expose sufficient access to the underlying communication data, etc.

Committer electronic device 110 and receiver electronic device 120 may communicate over quantum communication channel 130, which may be an optical channel that uses photons of light for communication. Quantum communication channel 130 may include noise that is naturally-occurring on quantum communication channel 130.

Committer electronic device 110 and receiver electronic device 120 may each execute committer computer program 115 and receiver computer program 125, respectively. Committer computer program 115 and receiver computer program 125 may implement a quantum oblivious transfer protocol.

In one embodiment, committer electronic device 110 and receiver electronic device 120 may also communicate over classical communication channel 140, which may be any suitable communication channel (e.g., non-quantum). Classical communication channel 140 may be used for the communication of any classical (e.g., non-quantum) information.

Figure 2B:
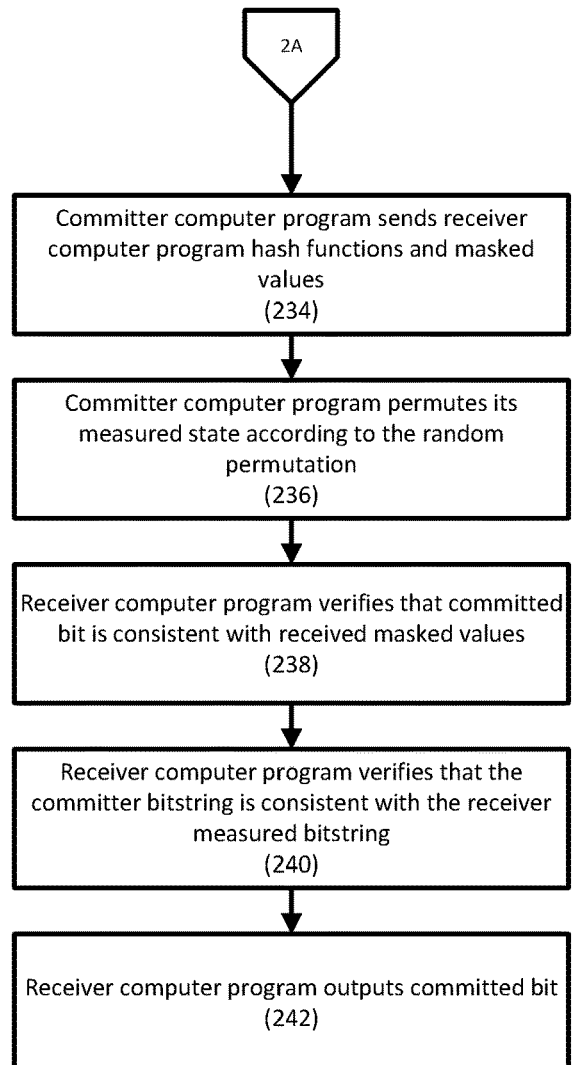

Referring to FIGS. 2A and 2B, a method for conducting composable quantum oblivious transfer over noisy quantum channels is disclosed according to an embodiment. It should be noted that, although these steps are listed sequentially, certain steps may be performed in parallel as is necessary and/or desired.

In step 200, the committer and the receiver may define a value, Q, which is the maximal quantum bit error rate that the committer and receiver have agreed to tolerate on the quantum channel. The value of Q may be defined based on the amount of practical noise on the quantum communication channel that is acceptable. The value of Q may be defined, for example, as part of system configuration.

The allowed value of Q may depend on the desired level of security. For example, if more noise is allowed, there is a greater possibility-albeit still very small—that one of the parties could succeed in being dishonest.

In one embodiment, the committer and the receiver may define the value Q over a classical communication channel.

In step 202, a committer computer program executed by a committer electronic device may chose two committer N-bit bitstrings, x, $\theta$, where N is chosen to be sufficiently large so as to guarantee the desired level of security. The committer computer program may send an N-qubit state, $|x\rangle^\theta$, to a receiver computer program executed by a receiver electronic device, where the bits of $\theta$ determine which basis each of the N qubits is prepared in, and the bits of x determine which elements of said basis are prepared. The committer bitstrings x and $\theta$ are classical bitstrings that determine what quantum states $|x\rangle^\theta$ that the committer will send to the receiver and determine what quantum communication occurs.

In step 204, the receiver computer program may choose a receiver N-bit bitstring, $\hat{\theta}$, and may obtain a string $\hat{x}$ by measuring the quantum state it received according to the basis for the state $\hat{\theta}$.

In step 206, the receiver computer program may engage with the committer computer program to sequentially commit to a pair of bits, $\hat{x}_i$, $\hat{\theta}$, by engaging in a commitment functionality of an equivocable and statistically hiding or binding bit commitment scheme, such as EqCommit. EQCommit is an interactive protocol between the committer and the receiver, driven by the receiver computer program.

In step 208, the committer computer program may send the receiver computer program a subset of indices, T, wherein $T \subset \{0, \ldots N\}$, and may engage the receiver computer program in an opening protocol of an equivocable, statistically binding and computationally hiding bit commitment scheme such as EqOpen, to open the commitments to $\hat{x}_i$, $\hat{\theta}$ using the chosen subset of indices, T. If more than the previously decided proportion fail to open, the committer computer program may abort as it will not be able to guarantee the desired security of the protocol.

In step 210, the committer computer program may verify that the proportion of errors, in which $\theta = \hat{\theta}$ and $x_i \neq \hat{x}_i$, is no larger than the agreed-upon value Q. If they are, the committer computer program aborts.

In step 212, the committer computer program and the receiver computer program may restrict the committer bitstrings x, $\theta$, and the receiver bitstrings, $\hat{x}$, $\hat{\theta}$, to the indices not in T, and the committer computer program may send one of the committer bitstrings, $\theta$, to the receiver computer program. For example, the committer computer program and the receiver computer program may discard everything in the committer bitstrings and the receiver bit strings except for the specified indices. Because the indices in T have been made public, they no longer provide the necessary guarantees of privacy and uncertainty. Thus, indices not in T are used.

In step 214, the committer computer program may generate commitments $c_x$, and $c_\theta$ to the committer bitstrings, x, $\theta$, using a statistically hiding or binding bit commitment scheme.

In step 216, the committer computer program may choose a random permutation, $\pi$, on $|x|$ bits in one of the committer bitstrings, and may send a description of the random permutation to the receiver computer program.

In step 218, the receiver computer program may construct two sets of indices, $I_b$, $I_{1-b}$, where b is a randomly chosen bit, and may set $I_b$ to the set of indices in which $\theta = \hat{\theta}$, and $I_{1-b}$ is the opposite.

In step 220, the receiver computer program may send the two sets of indices, $I_b$, $I_{1-b}$, to the committer computer program.

In step 222, the committer computer program may use, for example, a forward error correcting code to correct up to Q errors in x; by constructing syndromes, $s_0$, $s_1$, for $x_0$, $x_1$ as partitioned by $I_0$, $I_1$. The syndromes contain information that allows the receiver computer program to use a decoding technique to correct errors.

Any suitable error correcting code may be used as is necessary and/or desired.

In step 224, the committer computer program may send the syndromes, $s_0$, $s_1$, to the receiver computer program.

In step 226, the receiver computer program may use sp to correct one of the receiver bitstrings $\hat{x}_b$ using a suitable decoding technique for the forward error correcting code that was used.

In step 228, the committer computer program may permute the committer bitstring, x, according to the randomly chosen permutation, $\pi$.

In step 230, the committer computer program may partition the permuted bitstring into equal length committer bit substrings, $x_1$, $x_2$, . . . $x_m$, and may selects m random hash functions, $h_1$, $h_2$, . . . $h_m$, from a family of universal hash functions that map inputs to a single bit.

In step 232, to complete the commitment of bit c, the committer computer program may apply each hash function to the corresponding committer bit substring, and may mask the value of the committed bit using the output of the hash functions (e.g., $d_i = h_i(x_1) \oplus c$). It may then send the hash functions, $h_1$, and the masked values, $d_1$, to the receiver computer program.

The receiver computer program may use the hash functions, $h_1$, and the masked values, $d_1$, to confirm that the committer computer program has not "cheated." For example, committer computer program cannot convince the receiver computer program that it has committed to any value other than c).

In one embodiment, the completion of the commitment may be completed after a period of time, such as after some arbitrary computation has occurred and the committer wishes to prove that it made use of the committed value and not some arbitrarily chosen input.

In step 234, the committer computer program may open the previously transmitted commitments ($c_x$, and $c_\theta$) revealing the committer bitstrings, x, $\theta$, and may send the receiver computer program the committed bit c.

In step 236, the receiver computer program may permute its receiver bitstring ($\hat{x}$) according to the random permutation received from the committer computer program ($\pi$).

In step 238, the receiver computer program may verify that the committed bit, c, is consistent with all of the masked values it received by computing its own masked value using the receiver bit and the hash functions received from the committer computer program. For example, for each ($h_1$, $d_1$) that the receiver computer program received, the receiver computer program may verify that $d_1 = h_1(\hat{x}_1) \oplus c$. where $\hat{x}_1$ are segments of $\hat{x}$ according to the same technique as in step 230. If any fail, the receiver computer program aborts.

In step 240, the receiver computer program may verify that the committer bitstring, x, it received is consistent with the receiver measured bitstring $\hat{x}$ at all of the locations where the committer and receiver basis bitstrings $\theta$ and $\hat{\theta}$ matched. For example, the receiver computer program may verify that $\forall i \in I_b$ $x_i = \hat{x}_i$. If it does not, the receiver computer program aborts.

In step 242, the receiver computer program may output the committed bit c. Thus, if the receiver computer program has verified the value c is the bit committed to by the committer computer program, the receiver computer program may output c to be used in future operations involving the receiver computer program.

Figure 3:
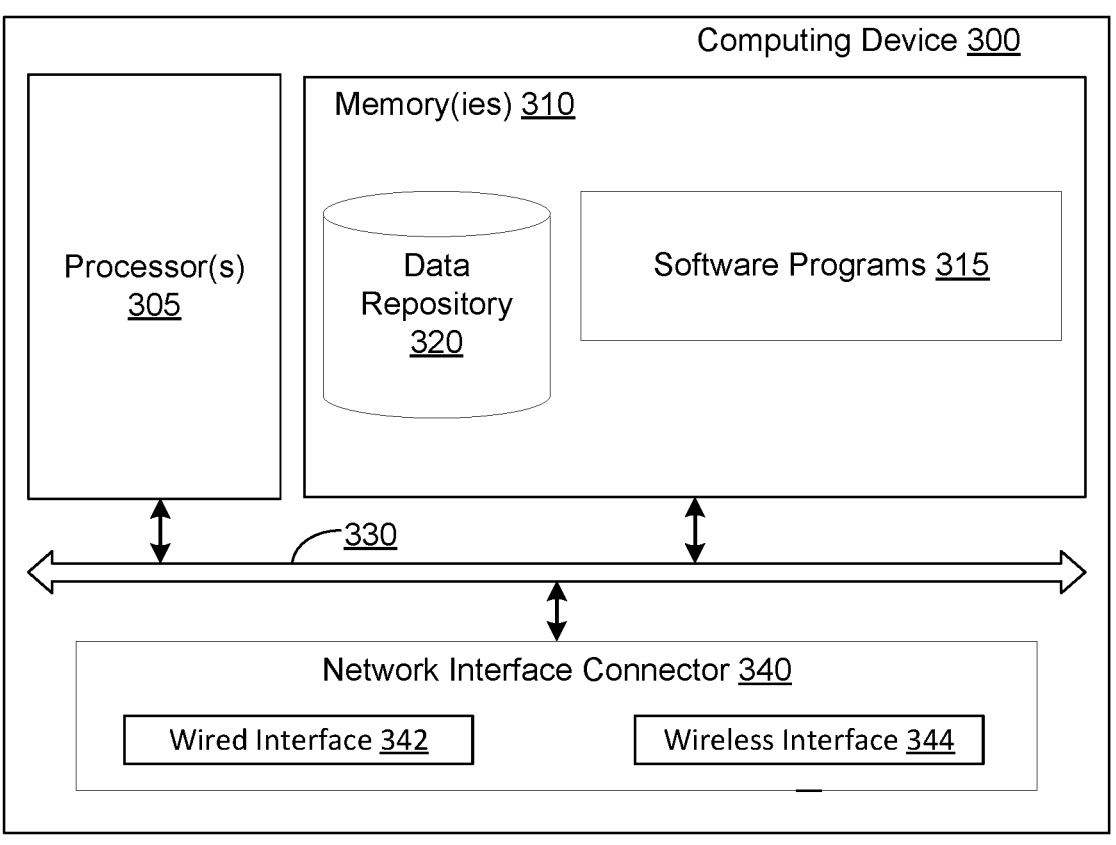
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting sequentially composable quantum oblivious transfer over noisy quantum channels, comprising:

defining, by a committer computer program executed by a committer electronic device and with a receiver computer program executed by a receiver electronic device, to a maximal quantum bit error rate over a quantum communication channel;

verifying, by the committer computer program, that a current quantum bit error rate for a quantum communication between the committer electronic device and the receiver electronic device is no larger than the maximal quantum bit error rate;

restricting, by the committer computer program, a first committer bitstring and a second committer bitstring to a first set of indices;

sending, by the committer computer program, the second committer bitstring to the receiver computer program;

committing, by the committer computer program, to the first committer bitstring and the second committer bitstring using a statistically hiding or binding bit commitment scheme;

choosing, by the committer computer program, a random permutation on the first committer bitstring;

partitioning, by the committer computer program, the first committer bitstring into a plurality of equal length substrings; and applying, by the committer computer program, a random hash function to each of the equal length substrings and masking a value of a commitment bit using an output of the random hash functions.

2. The method of claim 1, further comprising:

sending, by the committer computer program, a sequence of qubit states to the receiver computer program as determined by the first committer bitstring and a second committer bitstring.

3. The method of claim 1, further comprising:

opening, by the committer computer program, commitments to the first committer bitstring and the second committer bitstring; and sending, by the committer computer program, the committed bit to the receiver computer program.

4. The method of claim 1, further comprising:

sending, by the committer computer program, the random hash functions and the receiver masked value to the receiver computer program;

wherein the receiver computer program is configured to permute the first receiver bitstring according to the random permutation, compute a receiver masked value for the committed bit using the first receiver bitstring and the random hash function, verify that the receiver masked value for the committed bit is consistent with the masked value received from the committer computer program, and verify that the committer bitstring is consistent with the receiver bitstring at indices in the first set of indices where basis choices match.

5. The method of claim 1, wherein the maximal quantum bit error rate dictates an amount of practical noise allowed over the quantum communication channel.

6. The method of claim 1, wherein the committer computer program commits to the first committer bitstring and the second committer bitstring using a statistically hiding or binding bit commitment scheme.

7. The method of claim 1, further comprising:

receiving, by the committer computer program and from the receiver computer program, two second sets of indices;

correcting, by the committer computer program, up to the maximal quantum bit error rate in partitioned bits for the first receiver bitstring by constructing a plurality of syndromes that are partitioned by the two second sets of indices;

sending, by the committer computer program, the plurality of syndromes to the receiver computer program, wherein the receiver computer program is configured to correct errors in a first receiver bitstring; and permuting, by the committer computer program, the first committer bitstring using the random permutation.

8. The method of claim 7, wherein the plurality of syndromes comprise information that configures the receiver computer program to use a decoding technique to correct errors in the first receiver bitstring.

9. A method for conducting sequentially composable quantum oblivious transfer over noisy quantum channels, comprising:

defining, by a receiver computer program executed by a committer electronic device and with a committer computer program executed by a receiver electronic device, to a maximal quantum bit error rate over a quantum communication channel;

measuring, by the receiver computer program, a first receiver bitstring by measuring a state received from the committer computer program over the quantum communication channel;

restricting, by the receiver computer program, a first receiver bitstring and a second receiver bitstring to a first set of indices;

receiving, by the receiver computer program, a random permutation from the committer computer program;

constructing, by the receiver computer program, two second sets of indices;

sending, by the receiver computer program, the two second sets of indices to the committer computer program;

receiving, by the receiver computer program, a plurality of syndromes that are partitioned by the two second sets of indices;

correcting, by the receiver computer program, the measured state using the plurality of syndromes; and receiving, by the receiver computer program, a plurality of hash functions and masked values for a committed bit that are masked with an output of the plurality of hash functions from the committer computer program.

10. The method of claim 9, further comprising:

receiving, by the receiver computer program, a value for the committed bit; and confirming the value of the committed by calculating, by the receiver computer program, the value for the committed bit using the plurality of hash functions and the masked value.

11. The method of claim 9, wherein the state received from the committer computer program comprises a first committer bitstring and a second committer bitstring.

12. The method of claim 9, further comprising:

permuting, by the receiver computer program, the first receiver bitstring according to the random permutation;

computing, by the receiver computer program, a receiver masked value for the committed bit using the first receiver bitstring and the plurality of hash functions;

verifying, by the receiver computer program, that the receiver masked value for the committed bit is consistent with the masked value received from the committer computer program; and verifying, by the receiver computer program, that the committer bitstring is consistent with the receiver bitstring at indices in the first set of indices where basis choices match.

13. The method of claim 9, wherein the maximal quantum bit error rate dictates an amount of practical noise allowed over the quantum communication channel to be withstood while maintaining a desired security level.

14. The method of claim 9, wherein the state received from plurality of syndromes comprise information that configures the receiver computer program to use a decoding technique to correct errors in the first receiver bitstring.

15. A system, comprising:

a committer electronic device executing a committer computer program;

a receiver electronic device executing a receiver computer program; and a quantum communication channel over which the committer electronic device and the receiver electronic device communicate quantum information;

wherein:

the committer computer program and the receiver computer program define a maximal quantum bit error rate over a quantum communication channel;

the receiver computer program measures a first receiver bitstring by measuring a state received from the committer computer program over the quantum communication channel;

the committer computer program verifies that a current quantum bit error rate for the quantum communication channel is no larger than the maximal quantum bit error rate;

the committer computer program restricts a first committer bitstring and a second committer bitstring to a first set of indices;

the committer computer program sends the second committer bitstring to the receiver computer program;

the committer computer program commits to the first committer bitstring and the second committer bitstring using a statistically hiding or binding bit commitment scheme;

the committer computer program chooses a random permutation on the first committer bitstring;

the receiver computer program constructs and sends two sets of second indices to the committer computer program;

the committer computer program corrects partitioned bits for the first receiver bitstring up to the maximal quantum bit error rate by constructing a plurality of syndromes that are partitioned by the two sets of second of indices;

the committer computer program sends the plurality of syndromes to the receiver computer program;

the receiver computer program corrects errors in a first receiver bitstring using the plurality of syndromes;

the committer computer program permutes the first committer bitstring using the random permutation;

the committer computer program partitions the first committer bitstring into a plurality of equal length substrings; and the committer computer program applies a random hash function to each of the equal length substrings and masking a value of a commitment bit using an output of the random hash functions.

16. The system of claim 15, wherein the committer computer program sends a qubit state to the receiver computer program comprising the first committer bitstring and a second committer bitstring.

17. The system of claim 15, wherein the committer computer program opens commitments to the first committer bitstring and the second committer bitstring and sends the committed bit to the receiver computer program.

18. The system of claim 15, wherein the receiver computer program receives a plurality of hash functions and masked values for a committed bit that are masked with an output of the plurality of hash functions from the committer computer program.

19. The system of claim 18, wherein the committer computer program sends the random hash functions and the receiver masked value to the receiver computer program, and the receiver computer program permutes the first receiver bitstring according to the random permutation, computes a receiver masked value for the committed bit using the first receiver bitstring and the plurality of hash functions, verifies that the receiver masked value for the committed bit is consistent with the masked value received from the committer computer program, and verifies that the committer bitstring is consistent with the receiver bitstring at indices where basis choices match.

20. The system of claim 15, wherein the maximal quantum bit error rate dictates an amount of practical noise allowed over the quantum communication channel.

21. The system of claim 15, wherein the state received from plurality of syndromes comprise information that configures the receiver computer program to use a decoding technique to correct errors in the first receiver bitstring.

22. The system of claim 15, further comprising a classical communication channel over which the committer electronic device and the receiver electronic device communicate classical information.

* * * * *